United States Patent
Zmyslowski et al.

[11] Patent Number: 5,592,810
[45] Date of Patent: *Jan. 14, 1997

[54] CLEVIS LINK

[75] Inventors: Mark Zmyslowski, Grosse Pointe Shores; Erik W. Larson, Birmingham, both of Mich.

[73] Assignee: Radar Industries, Inc., Roseville, Mich.

[ * ] Notice: The term of this patent shall not extend beyond the expiration date of Pat. No. 5,435,661.

[21] Appl. No.: 642,485

[22] Filed: May 3, 1996

Related U.S. Application Data

[63] Continuation of Ser. No. 507,004, Jul. 25, 1995, Pat. No. 5,533,328.
[51] Int. Cl.⁶ .............................. B21L 11/00; F16G 15/00
[52] U.S. Cl. ........................................................ 59/78; 59/91
[58] Field of Search ................................ 59/13, 15, 35.1, 59/78, 91, 92, 84; 403/65, 79, 162; 180/68.4

[56] References Cited

U.S. PATENT DOCUMENTS

| | | | |
|---|---|---|---|
| 1,107,808 | 8/1914 | Locke | 59/78 |
| 1,116,054 | 11/1914 | Glaser | 59/78 |
| 1,448,663 | 3/1923 | Hoya | 59/78 |
| 3,312,117 | 4/1967 | Gritt | 59/91 |
| 3,359,814 | 12/1967 | Kummerer et al. | 59/91 |
| 4,579,184 | 4/1986 | Hiramoto | 180/68.4 |
| 5,435,661 | 7/1995 | Zmyslowski et al. | 403/79 |
| 5,533,328 | 7/1996 | Zmyslowski et al. | 59/15 |

*Primary Examiner*—David Jones
*Attorney, Agent, or Firm*—Young & Basile, P.C.

[57] ABSTRACT

A stamped link and a method of forming the link. The link is a clevis link formed of a single piece of sheet metal and includes a generally planar main body portion, a curl portion proximate the rearward end of the link forming a first bearing surface defining a rearward pivot axis, longitudinal edge flange portions upstanding from the main body portion, side wall portions upstanding from the main body portion proximate the forward end of the link inboard of each edge flange portion and each having an upper edge generally at the level of the upper edge of the associated edge flange, a central ridge upstanding from the main body portion between the ends of the link and blending at its forward end in the side walls, and aligned apertures in each edge flange and its associated side wall proximate the forward end of the link forming a second bearing surface defining a forward pivot axis.

12 Claims, 3 Drawing Sheets

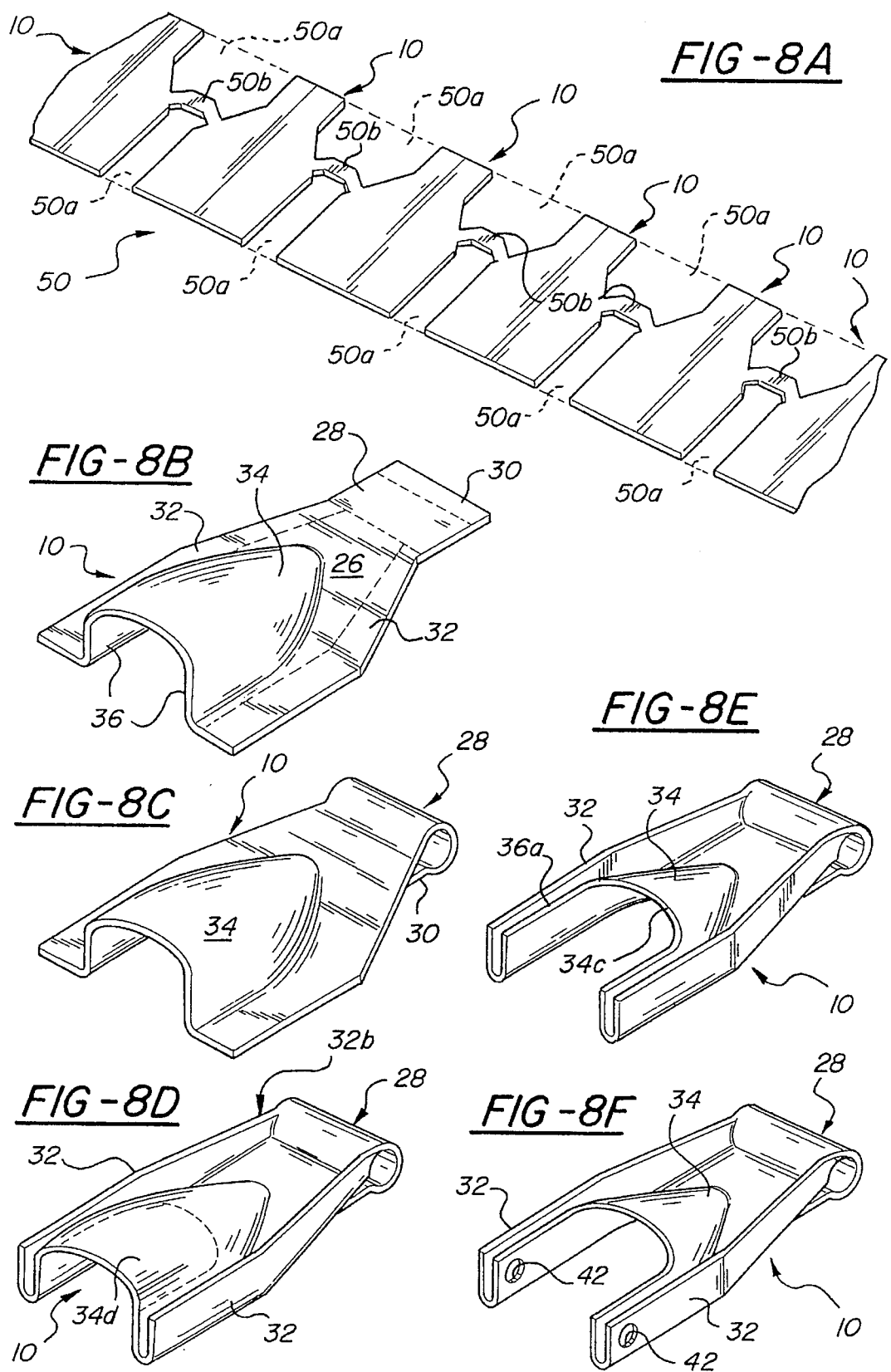

5,592,810

CLEVIS LINK

This is a continuation of application Ser. No. 08/507,004 filed on Jul. 25, 1995, now U.S. Pat. No. 5,533,328.

BACKGROUND OF THE INVENTION

This invention relates to a link and to a method of forming a link.

Links are in common usage in many manufacturing environments including, for example, the automotive environment. In each case where a link is required, especially in the automotive environment, it is critical that the link satisfactorily perform its pivotal interconnecting functions, that the link provide adequate strength to preclude failure of the link or failure of the associated linkage assembly, that the weight of the link be minimized, and that the link be manufacturable at a minimal cost.

Whereas cast or forged links generally provide adequate performance and provide adequate strength, they tend to be relatively heavy and relatively expensive, and whereas stamped links are generally lightweight and inexpensive, they often have marginal strength, particularly in heavy duty applications, and often provide only marginal performance.

SUMMARY OF THE INVENTION

This invention is directed to the provision of an improved stamped link.

More specifically, this invention is directed to the provision of a stamped link that is lightweight, inexpensive, and provides satisfactory strength and endurance even in heavy duty applications.

This invention is further directed to the provision of a method of forming a lightweight, inexpensive, and strong link in a stamping operation.

The invention methodology relates to the formation of a stamped link from a single piece of sheet metal with the link including forward and rearward pivot axes at the forward and rearward ends of the link extending generally perpendicular to the lengthwise axis of the link. According to the invention methodology, a bubble is formed between the longitudinal side edges of the piece extending from the forward end of the piece to a location spaced from the rearward end of the piece so as to form laterally spaced upwardly extending side walls proximate the forward end of the piece spaced inwardly from the respective longitudinal side edges of the piece; the rearward end of the piece is formed into a curl to form a first bearing surface defining the rearward pivot axis of the link; the longitudinal side edges of the piece are bent upwardly to form an edge flange positioned proximate the forward end of the piece outboard of each side wall; and aligned holes are formed in each edge flange and its associated side wall to form a second bearing surface defining the forward pivot axis of the link. This methodology provides a simple and inexpensive means of forming a lightweight and strong link.

According to a further feature of the invention methodology, the bubble is removed proximate the forward end of the link while leaving the side walls intact so as to form a clevis structure at the forward end of the link.

According to a further feature of the invention methodology, the removing step includes leaving a portion of the bubble spaced from the forward end of the link so as to provide a central reinforcing ridge for the link.

According to a further feature of the invention methodology, the curling step includes forming a circular portion defining the first bearing surface and forming a flat tab portion beyond the circular portion, and the method includes the further step of fixedly securing the flat tab portion to the undersurface of the piece immediately forwardly of the circular portion. This methodology adds to the strength of the link without adding significantly to the weight of the link.

The invention link includes a generally planar main body portion; a curl portion proximate the rearward end of the link forming a first bearing surface defining a rearward pivot axis extending perpendicular to the lengthwise axis of the link; longitudinal edge flange portions upstanding from the main body portion; side wall portions upstanding from the main body portion proximate the forward end of the link inboard of each edge flange portion and each having an upper edge generally at the level of the upper edge of the associated edge flange portion; a central ridge upstanding from the main body portion between the ends of the link and blending at its forward end in the side wall portions; and aligned apertures in each edge flange portion and its associated side wall portion proximate the forward end of the link forming a second bearing surface defining a forward pivot axis extending perpendicular to the longitudinal axis of the link.

According to a further feature of the invention link, the curl portion comprises a circular portion defining the first bearing surface and the link further includes a flat tab portion forming a forward extension of the circular portion and means securing the flat tab portion to the undersurface of the main body portion of the link immediately forwardly of the circular portion. In the disclosed embodiment of the invention the securing means comprises a weld.

According to a further feature of the invention link, the edge flange portions extend the entire length of the link and blend at their upper edges at the rearward end of the link with the curl portion.

According to a further feature of the invention ink, the central ridge has a generally triangular configuration in transverse cross section and coacts with the edge flange portions to define a W configuration in cross section.

According to a further feature of the invention link, the central ridge has a generally triangular configuration in plan view and angles upwardly and forwardly from the main body portion at an apex portion positioned between the ends of the link to a base portion proximate to and blending with the rearward ends of the side wall portions.

According to a further aspect of the invention link, the link includes a curl portion at its rearward end having a generally circular longitudinal cross-sectional configuration forming a generally cylindrical bearing surface defining a rearward pivot axis for the link substantially perpendicular to the longitudinal axis of the link; the link has a bifurcated configuration at its forward end; the link has a U-shaped transverse cross-sectional configuration extending forwardly from the curl, a W-shaped transverse cross-sectional configuration in a central region of the link, and a discontinuous transverse cross-sectional configuration at the bifurcated forward end of the link comprising two transversely spaced U-shaped sections; and the link further includes aligned apertures in the U-shaped sections coacting to form a bearing surface defining a forward pivot axis for the link extending substantially perpendicular to the longitudinal axis of the link.

BRIEF DESCRIPTION OF THE DRAWINGS

FIGS. 8A–8F illustrate steps in the invention methodology.

DETAILED DESCRIPTION OF THE PREFERRED EMBODIMENT

The invention relates to the formation of a link or strut in a stamping operation utilizing sheet metal material. The sheet metal may comprise, for example, a high strength low alloy steel such as 050XHSLA and may, for example, have a thickness of 2.5 mils.

Figure 1:
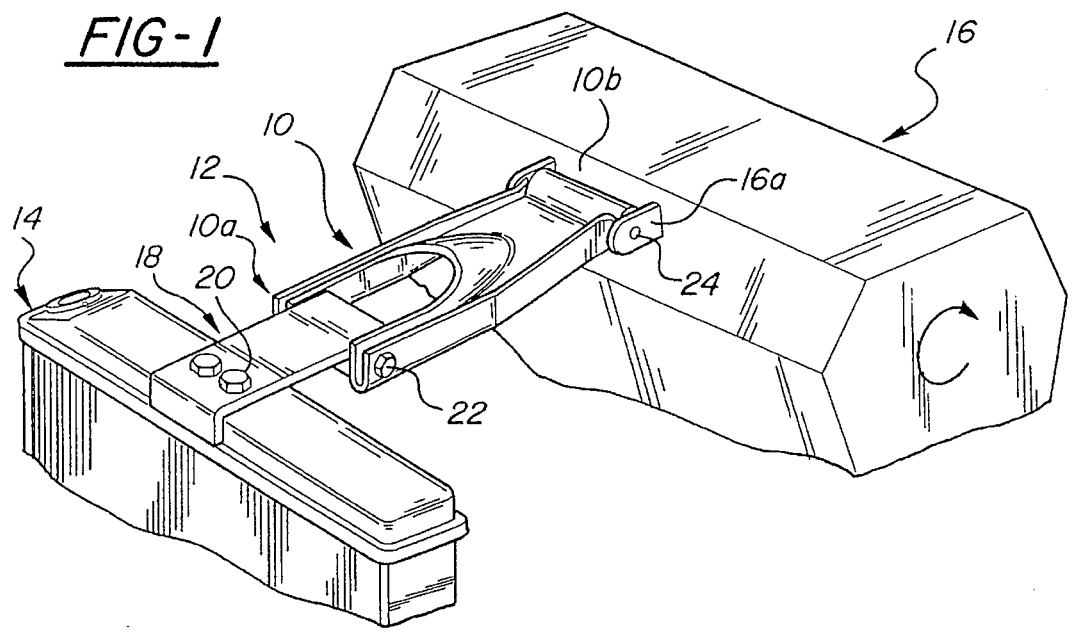
FIG. 1 is a fragmentary view of a motor vehicle showing a linkage assembly embodying the invention link.
Figure 2:
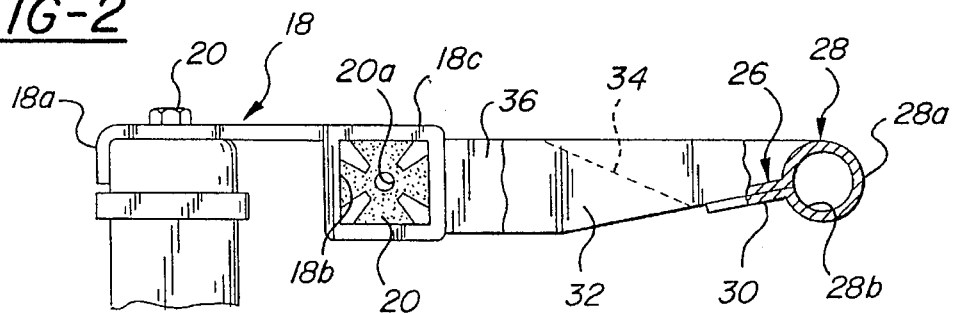
FIG. 2 is a side view of the linkage assembly seen in FIG. 1.
Figure 4:
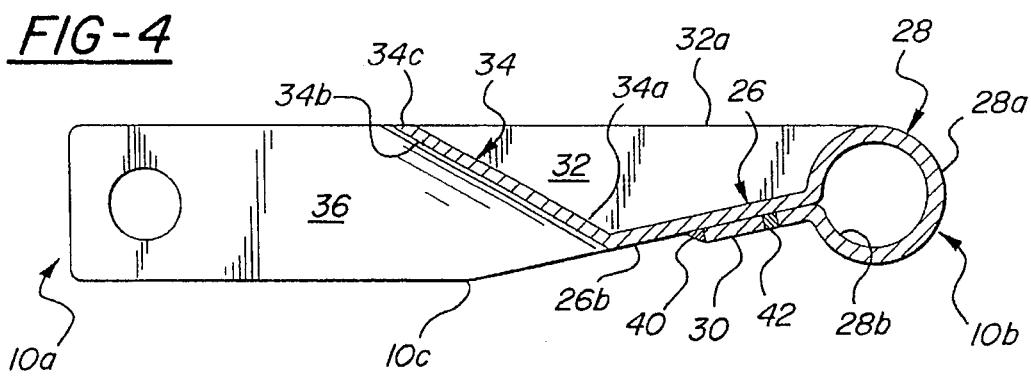
FIGS. 4 and 5 are cross sectional views taken respectively on lines 4—4 and 5—5 of FIG. 3.
Figure 3:
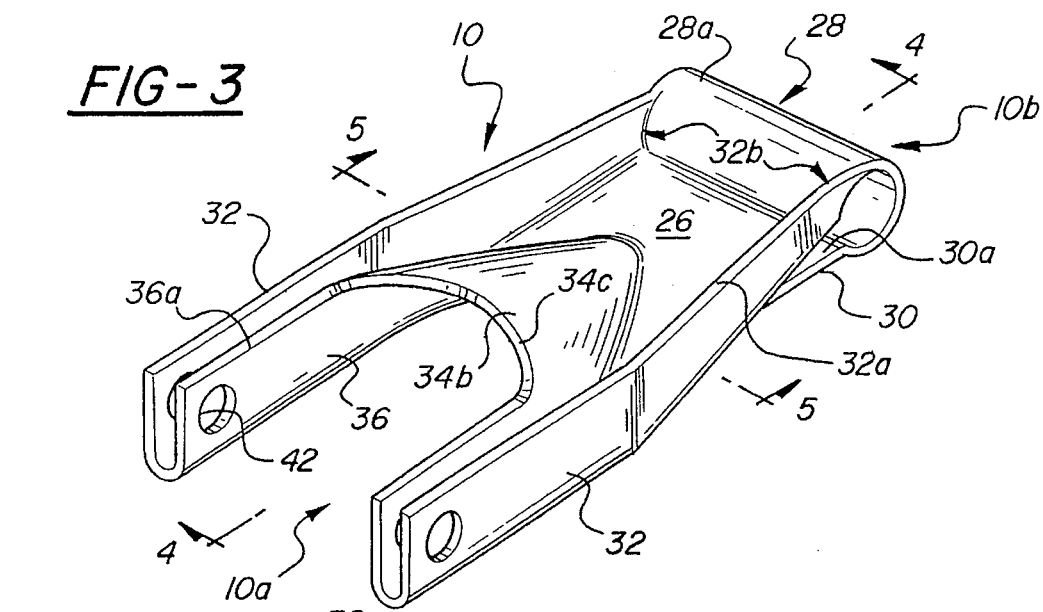
FIG. 3 is a perspective view of the invention link.

The invention link 10 may be utilized in any application requiring a link or strut connecting forward and rearward pivot axes. For example, as seen in FIG. 1, the link 10 may form a part of a linkage assembly 12 interconnecting the radiator tie bar 14 of a motor vehicle and an east/west mounted engine 16 forming a part of a front wheel drive assembly for the motor vehicle.

The linkage assembly 12 includes a radiator tie bar bracket 18 fixedly secured at its forward end 18a to the radiator tie bar 14 as by bolts 20 and defining a socket 18b at its rearward end 18c receiving a rubber bushing or biscuit 20 defining a cylindrical central transverse bore 20a. The forward end 10a of link 10 is pivotally secured to the rearward end 18c of bracket 18 by a pivot pin 22 pivotally engaging the rearward end of the link and positioned in bore 20a, and the rearward end 10b of the link is pivotally secured as by a pin 24 to the engine 16 utilizing, for example, lugs or tabs 16a. The linkage assembly 12 will be seen to limit the torque induced rotation of the engine in known manner.

Link 10 includes a generally planar main body portion 26; a curl portion 28 proximate the rearward end 10b of the link; a flat tab portion 30; longitudinal edge flange portions 32; a central ridge portion 34; and side wall portions 36.

Curl portion 28 comprises a circular portion 28a defining a cylindrical bearing surface 28b at its inner periphery so as to define a rearward pivot axis for the link for pivotal receipt, for example, of pivot pin 24.

Flat tab 30 extends forwardly from circular portion 28a in underlying relation to the undersurface 26b of main body portion 26 and is fixedly secured to the undersurface of the main body portion by a weld 40 and by further welds 42 positioned in apertures 30a in tab 30.

Longitudinal edge flange portions 32 extend upwardly from main body portion 26 and extend the entire length of the link. The upper edge 32a of each edge flange blends generally tangentially with the top of circular portion 28a so that the upper edges of the edge flange portions and the top of the circular portion 28a are at substantially the same level.

Figure 6:
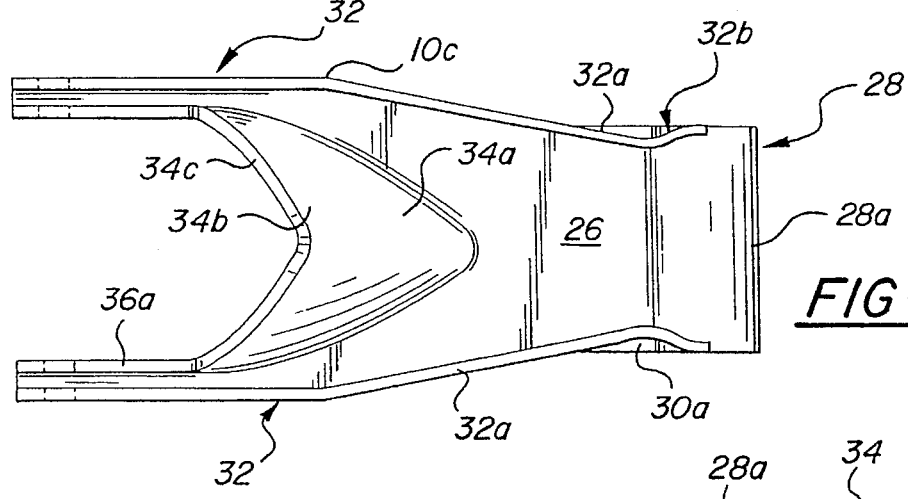
FIG. 6 is a top or plan view of the invention link.
Figure 5:
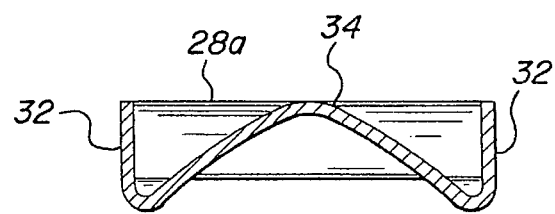
Figure 7:
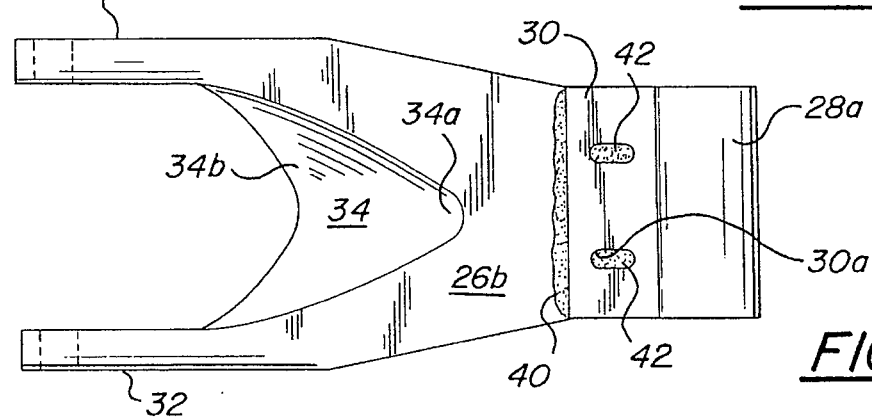
FIG. 7 is a bottom view of the invention link.

Central ridge 34 upstands from main body portion 26 between the forward and rearward ends of the links. Central ridge 34 is generally of triangular configuration in transverse cross section, as seen in FIG. 5, and also has a generally triangular configuration in top plan view, as seen in FIG. 6. Central ridge 34 angles upwardly and forwardly from the main body portion from an apex portion 34a and terminates in a base portion 34b. Base portion 34b defines an upper curvilinear edge 34c positioned at the level of the upper edges 32a of the edge flange portions.

Each side wall portion 36 is positioned in inboard confronting relation to a respective edge flange 32 so as to form a U-shaped cross-sectional configuration with the associated edge flange. Side wall portions 36 will be seen to be formed as laterally spaced forward extensions of central ridge 34 with the upper edge 36a of each side wall portion blending with the upper edge 34c of the base portion of the central ridge. Upper edges 36a, 34c, and 32a are all at the same level as the top of circular portion 28a so that the top of the link presents a flat planar configuration as viewed in side elevation.

Aligned apertures 42 are provided in edge flange portions 32 and side wall portions 36 and coact to define a forward bearing surface for the link for pivotal receipt, for example, of pivot pin 22 with the bifurcated forward ends of the link positioned in flanking relation to the socket portion 18c of the bracket 18.

It will be seen that the link has a U-shaped transverse cross-sectional configuration extending forwardly from the curl, a W-shaped transverse cross-sectional configuration in the central region occupied by the ridge 34, and a discontinuous transverse cross-sectional configuration at the bifurcated forward end 10a of the link comprising two transversely spaced U-shaped sections.

The link will be seen in plan view to have a maximum width at the forward end 10a of the link and to taper inwardly beginning at an intermediate point 10c so that the curl portion 28 has a transverse dimension substantially less than the transverse dimension of the bifurcated end 10a. The link will also be seen to taper upwardly from the point 10c so that the depth of the link immediately forwardly of the curl portion 28a is substantially less than the depth of the link at the bifurcated end 10a. The upward taper of the link between the point 10c and the curl 28 allows the main body portion 26 of the link to intersect the circular portion 28a at the approximate diametric midpoint of the portion 28a and allows the circular portion 28a to have a depth approximating the depth of the bifurcated end 10a of the link so that the link, in gross overview, has a substantially constant thickness from front to rear.

The methodology for forming the invention link is seen in FIGS. 8A–8F.

As seen in FIG. 8A, the links 10 are preferably formed from a continuous strip of sheet metal 50 so that a plurality of links 10 may be formed from a single continuous strip. For example, region 50a may be removed at selected locations along the continuous link 50 to define a plurality of link pieces 10 interconnected by straps 50b so as to form a chain of link pieces 10 interconnected by straps 50b.

Each link piece 17 is thereafter subjected to a series of stamping hits to draw a generally triangularly shaped upstanding bubble 34 extending from the front end 10a of the link to a position spaced from the rear end 10b of the link; whereafter the link is subjected to a plurality of further stamping hits to form the curl portion 28 and the flat tab 30; whereafter each link is subjected to a further series of stamping hits to form the upstanding longitudinal edge flange portions 32; whereafter a slug 34d is cut from the bubble 34 to form the upper edges 36a of the side walls 36 and define the central ridge 34 including the ridge upper edge 34c; whereafter apertures 42 are formed in the edge flanges and in the side walls in a piercing operation; whereafter the individual links are separated from the continuous strip 50 by severing the straps 50; whereafter, at a further workstation removed from the stamping work station, the tab 30 is welded to the underface 26b of the main body portion 26a of the link utilizing welds 40 and Certain transition areas in the link require careful and specific development and, in particular, the transition area 32b between the edge flanges 32 and the curl 28 require careful multi-hit forming to ensure a smooth blending of the side flange and the curl portion and, specifically, to ensure that the upper edge 32a of the side flanges blend smoothly and tangentially with the top of the curl portion. Note'specifically in this regard that the twisting and shaping of the portions 32b of the edge flanges results in the rearward portion 30a of the flat tab being exposed since the tab portion 30 at that point is wider than the confronting portion of the link immediately overlying the tab portion by virtue of the development of the edge portions 32b to a blending configuration with the curl portion.

The invention will be seen to provide a link that is extremely light, very inexpensive, and that yet has great strength and therefore superior performance characteristics. Specifically, the disclosed configuration of the link allows internal stresses to pass through the link without pooling of the stresses in any specific area of the link so that there is no tendency for local failure modes to develop in any particular area of the link. The invention also provides an improved methodology for forming the link so that the link may be formed efficiently and inexpensively.

Whereas a preferred embodiment of the invention has been illustrated and described in detail, it will be apparent that various changes may be made in the disclosed embodiment without departing from the scope or spirit of the invention.

We claim:

1. A clevis link formed of a single piece of sheet metal and including:
   a curl structure at a rearward end of the link formed as a rear end portion of the sheet metal piece curled around an axis generally transverse to a longitudinal axis of the link to form a transversely extending cylindrical bearing surface defining a rearward pivot axis extending generally transversely to the longitudinal axis of the link;
   a bifurcated structure rigid with the curl structure and including two transversely spaced forwardly extending sections defining an opening at a forward end of the link;
   a main body structure extending transversely between and rigidly interconnecting the spaced forwardly extending sections forwardly of the curl structure and blending with the spaced forwardly extending sections; and
   aligned apertures in the two sections defining a forward pivot axis extending generally transversely to the longitudinal axis of the link.

2. A clevis link according to claim 1 wherein the link further includes a flat tab portion formed as a forward extension of the curl structure and fixedly secured to a surface of the piece proximate but forwardly of the curl structure.

3. A clevis link according to claim 1 wherein each forwardly extending section includes an outboard upstanding longitudinal edge flange portion and an inboard upstanding longitudinal side wall portion inboard of the edge flange portion.

4. A clevis link according to claim 3 wherein the aligned apertures include apertures in each edge flange portion and apertures in each side flange portion.

5. A clevis link according to claim 4 wherein each edge flange portion and the corresponding side wall portion are formed in a folding operation with the fold line extending lengthwise of the link.

6. A clevis link formed of a single piece of sheet metal and including:
   a main body portion;
   a curl portion proximate a rearward end of the link forming a first bearing surface defining a rearward pivot axis extending generally perpendicular to the lengthwise axis of the link;
   two longitudinal edge flange portions proximate a forward end of the link;
   two longitudinal side wall portions proximate the forward end of the link inboard of and joined to the respective edge flanges;
   a central ridge portion upstanding from the main body portion between the ends of the link; and
   aligned apertures in each edge flange portion and its associated side wall portion proximate the forward end of the link forming a second bearing surface defining a forward pivot axis extending perpendicular to the lengthwise axis of the link.

7. A clevis link according to claim 6 wherein said curl portion comprises a circular portion defining said first bearing surface and said link further includes a tab portion forming a forward extension of said circular portion and means securing said tab portion to said main body portion immediately forwardly of said circular portion.

8. A clevis link according to claim 7 wherein said securing means comprises a weld.

9. A clevis link according to claim 6 wherein a top of said central ridge portion is generally at the level of a top of said edge flange portions and said side wall portions.

10. A clevis link formed of a single stamped piece of sheet material:
    said link including a curl portion at a rearward end thereof having a generally circular longitudinal cross-sectional configuration forming a generally cylindrical bearing surface defining a rearward pivot axis for the link substantially perpendicular to a longitudinal axis of the link;
    said link having a bifurcated configuration including two transversely spaced forwardly extending sections defining an opening at a forward end of the link;
    each forwardly extending section comprising an outboard upstanding flange portion and an inboard upstanding side wall portion joined to the associated flange portion along a longitudinal fold line;
    said link further including aligned apertures in said forwardly extending sections coacting to form a bearing surface defining a forward pivot axis for the link substantially perpendicular to the longitudinal axis of the link.

11. A clevis link according to claim 10 wherein said link further includes a tab portion extending forwardly from said curl portion and fixedly secured to a face of the piece proximate but forwardly of the curl portion.

12. A clevis link according to claim 11 wherein said tab is fixedly secured to the face of the piece by welding.

* * * * *

UNITED STATES PATENT AND TRADEMARK OFFICE
CERTIFICATE OF CORRECTION

| | |
|---|---|
| PATENT NO. | : 5,592,810 |
| APPLICATION NO. | : 08/642485 |
| DATED | : January 14, 1997 |
| INVENTOR(S) | : Mark Zmyslowski and Erik W. Larson |

It is certified that error appears in the above-identified patent and that said Letters Patent is hereby corrected as shown below:

On the title page item (63),

In the Related U.S. Application Data add

-- which is a divisional of Ser. No. 018,292, Feb. 16, 1993, Pat. No. 5,435,661. -- after "Continuation of Ser. No. 507,004, Jul. 25, 1995, Pat. No. 5,533,328."

Signed and Sealed this

Thirtieth Day of June, 2009

JOHN DOLL
*Acting Director of the United States Patent and Trademark Office*